United States Patent
Tanaka et al.

(10) Patent No.: US 11,156,948 B2
(45) Date of Patent: Oct. 26, 2021

(54) FUSER AND IMAGE FORMING APPARATUS

(71) Applicant: Brother Kogyo Kabushiki Kaisha, Nagoya (JP)

(72) Inventors: Tokifumi Tanaka, Komaki (JP); Hideki Kanada, Toyohashi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/145,927

(22) Filed: Jan. 11, 2021

(65) Prior Publication Data

US 2021/0132531 A1    May 6, 2021

Related U.S. Application Data

(63) Continuation of application No. 16/585,066, filed on Sep. 27, 2019, now Pat. No. 10,901,353.

(30) Foreign Application Priority Data

Sep. 28, 2018   (JP) .............................. JP2018-184428

(51) Int. Cl.
*G03G 15/20*     (2006.01)
*B65G 15/30*     (2006.01)

(52) U.S. Cl.
CPC ......... *G03G 15/2053* (2013.01); *B65G 15/30* (2013.01); *G03G 15/206* (2013.01); *G03G 15/2017* (2013.01); *G03G 2215/2009* (2013.01); *G03G 2215/2025* (2013.01)

(58) Field of Classification Search
None
See application file for complete search history.

(56) References Cited

U.S. PATENT DOCUMENTS

| | | | |
|---|---|---|---|
| 7,379,697 B2 | 5/2008 | Ito et al. |
| 8,032,068 B2 | 10/2011 | Hanyu et al. |
| 8,195,072 B2 | 6/2012 | Okuno |
| 8,909,116 B2 | 12/2014 | Ohtsu |
| 8,958,733 B2 | 2/2015 | Nishida et al. |
| 9,002,254 B2 | 4/2015 | Ohtsu |
| 9,008,560 B2 | 4/2015 | Otsu |
| 10,007,213 B2 | 6/2018 | Ikebuchi et al. |

(Continued)

FOREIGN PATENT DOCUMENTS

| | | |
|---|---|---|
| JP | 2006-119263 A | 5/2006 |
| JP | 2009-015227 A | 1/2009 |

(Continued)

*Primary Examiner* — Sevan A Aydin
(74) *Attorney, Agent, or Firm* — Banner & Witcoff, Ltd.

(57) ABSTRACT

A fuser has a heater, a heat roller, an endless belt, a pressure pad, and a slidable sheet. The pressure pad forms a nipping portion to nip the endless belt between the pressure pad and the heat roller. The slidable sheet is interposed between an inner circumferential surface of the endless belt and the pressure pad in the nipping portion. The slidable sheet includes a plurality of dents and a plurality of projections on a surface contacting the inner circumferential surface of the endless belt. The plurality of dents are arranged in a first part of the surface of the slidable sheet. The first part is located in a range corresponding to the nipping portion. The plurality of projections are arranged in a second part of the surface of the slidable sheet. The second part is located in a range corresponding to a portion different from the nipping portion.

16 Claims, 9 Drawing Sheets

(56) References Cited

U.S. PATENT DOCUMENTS

| | | |
|---|---|---|
| 10,365,596 B1 | 7/2019 | Tanaka et al. |
| 10,459,384 B2 | 10/2019 | Tanaka et al. |
| 2003/0170054 A1 | 9/2003 | Suzuki et al. |
| 2006/0083567 A1 | 4/2006 | Ito et al. |
| 2009/0014942 A1 | 1/2009 | Okuno |
| 2009/0208263 A1 | 8/2009 | Hanyu et al. |
| 2013/0034374 A1 | 2/2013 | Ohtsu et al. |
| 2013/0189007 A1 | 7/2013 | Ohtsu |
| 2013/0216282 A1 | 8/2013 | Ohtsu |
| 2013/0266354 A1 | 10/2013 | Nishida et al. |
| 2014/0086651 A1 | 3/2014 | Otsu |
| 2014/0205332 A1 | 7/2014 | Otsu |
| 2017/0097598 A1 | 4/2017 | Kudo et al. |
| 2017/0176905 A1 | 6/2017 | Suzuki et al. |
| 2017/0285537 A1 | 10/2017 | Onaka et al. |
| 2018/0164722 A1 | 6/2018 | Aoki |
| 2019/0243294 A1 | 8/2019 | Tanaka et al. |

FOREIGN PATENT DOCUMENTS

| | | |
|---|---|---|
| JP | 2009-198567 A | 9/2009 |
| JP | 2009-229494 A | 10/2009 |
| JP | 2013-148837 A | 8/2013 |
| JP | 2013-218175 A | 10/2013 |
| JP | 2014-063067 A | 4/2014 |
| JP | 2014-139641 A | 7/2014 |

FUSER AND IMAGE FORMING APPARATUS

CROSS REFERENCE TO RELATED APPLICATION

This application is a continuation of prior U.S. application Ser. No. 16/585,066, filed Sep. 27, 2019, which claims priority under 35 U.S.C. § 119 from Japanese Patent Application No. 2018-184428, filed on Sep. 28, 2018, the entire subject matter of which are incorporated herein by reference.

BACKGROUND

Technical Field

The present disclosure is related to a fuser and a conveyer with an endless belt.

Related Art

Conventionally, a fuser having a heat roller, an endless belt, a nip-formation member, and a slidable sheet is known. The nip-formation member may form a nipping portion, in which the nip-formation member nips the endless belt in cooperation the heat roller, so that the endless belt may be nipped between the nip-formation member and the heat roller. The slidable sheet may be interposed between an inner circumferential surface of the endless belt and the nip-forming member. The slidable sheet may, for example, have a plurality of dents on a surface, which is a surface to contact the inner circumferential surface of the endless belt, in a range corresponding to the nipping portion so that a lubricant agent may be stored in the dents.

For another example, a plurality of projections may be formed in the range on the surface of the slidable sheet corresponding to the nipping portion to reduce sliding resistance between the endless belt and the slidable sheet.

SUMMARY

According to an aspect of the present disclosure, A fuser, having a heater, a rotating body configured to be heated by the heater, an endless belt, a nip-formation member configured to form a nipping portion to nip the endless belt between the nip-formation member and the rotating body, and a slidable sheet interposed between an inner circumferential surface of the endless belt and the nip-formation member in the nipping portion, is provided. The slidable sheet includes a first part, in which a plurality of dents are arranged, and a second part, in which a plurality of first projections are arranged, on a surface contacting the inner circumferential surface of the endless belt. The first part is located in a range in the slidable sheet corresponding to the nipping portion. The second part is located in a range in the slidable sheet corresponding to a portion different from the nipping portion.

According to another aspect of the present disclosure, an image forming apparatus, having a photosensitive drum, a charger configured to charge a surface of the photosensitive drum, an exposure device configured to expose the surface of the photosensitive drum to light, a developing roller configured to supply toner to the surface of the photosensitive drum, a transfer roller configured to transfer a toner image formed on the surface of the photosensitive drum to a sheet, and a fuser configured to fix the toner image transferred from the surface of the photosensitive drum to the sheet thereon, is provided. The fuser includes a heater, a rotating body configured to be heated by the heater, an endless belt, a nip-formation member configured to form a nipping portion to nip the endless belt between the nip-formation member and the rotating body, and a slidable sheet interposed between an inner circumferential surface of the endless belt and the nip-formation member in the nipping portion. The slidable sheet includes a first part, in which a plurality of dents are arranged, and a second part, in which a plurality of first projections are arranged, on a surface contacting the inner circumferential surface of the endless belt. The first part is located in a range in the slidable sheet corresponding to the nipping portion. The second part is located in a range in the slidable sheet corresponding to a portion different from the nipping portion.

According to another aspect of the present disclosure, a conveyer, having a rotating body, an endless belt configured to convey a recording medium at a position between the rotating body and the endless belt, a nip-formation member configured to form a nipping portion to nip the endless belt between the nip-formation member and the rotating body, and a slidable sheet interposed between an inner circumferential surface of the endless belt and the nip-formation member in the nipping portion, is provided. The slidable sheet includes a first part, in which a plurality of dents are arranged, and a second part, in which a plurality of first projections are arranged, on a surface contacting the inner circumferential surface of the endless belt. The first part is located in a range in the slidable sheet corresponding to the nipping portion. The second part is located in a range in the slidable sheet corresponding to a portion different from the nipping portion.

DETAILED DESCRIPTION

Hereinafter, an exemplary embodiment according to the present disclosure will be described in detail with reference to the accompanying drawings. In the following description, directions related a laser printer 1 and each part or item included in the laser printer 1 will be referred to on basis of indications by arrows in FIG. 1. For example, in FIG. 1, a viewer's a left-hand side, a right-hand side, an upper side, and a lower side will be referred to as a front side, a rear side, an upper side, and a lower side, respectively. Moreover, the viewer's farther side and nearer side within FIG. 1 will be referred to as a leftward side and a rightward side in the laser printer 1, respectively. A front-to-rear or a rear-to-front direction may be referred to as a front-rear direction, a left-to-right or right-to-left direction may be referred to as a left-right direction, and an up-to-down or down-to-up direction may be referred to as a vertical direction.

Figure 1:
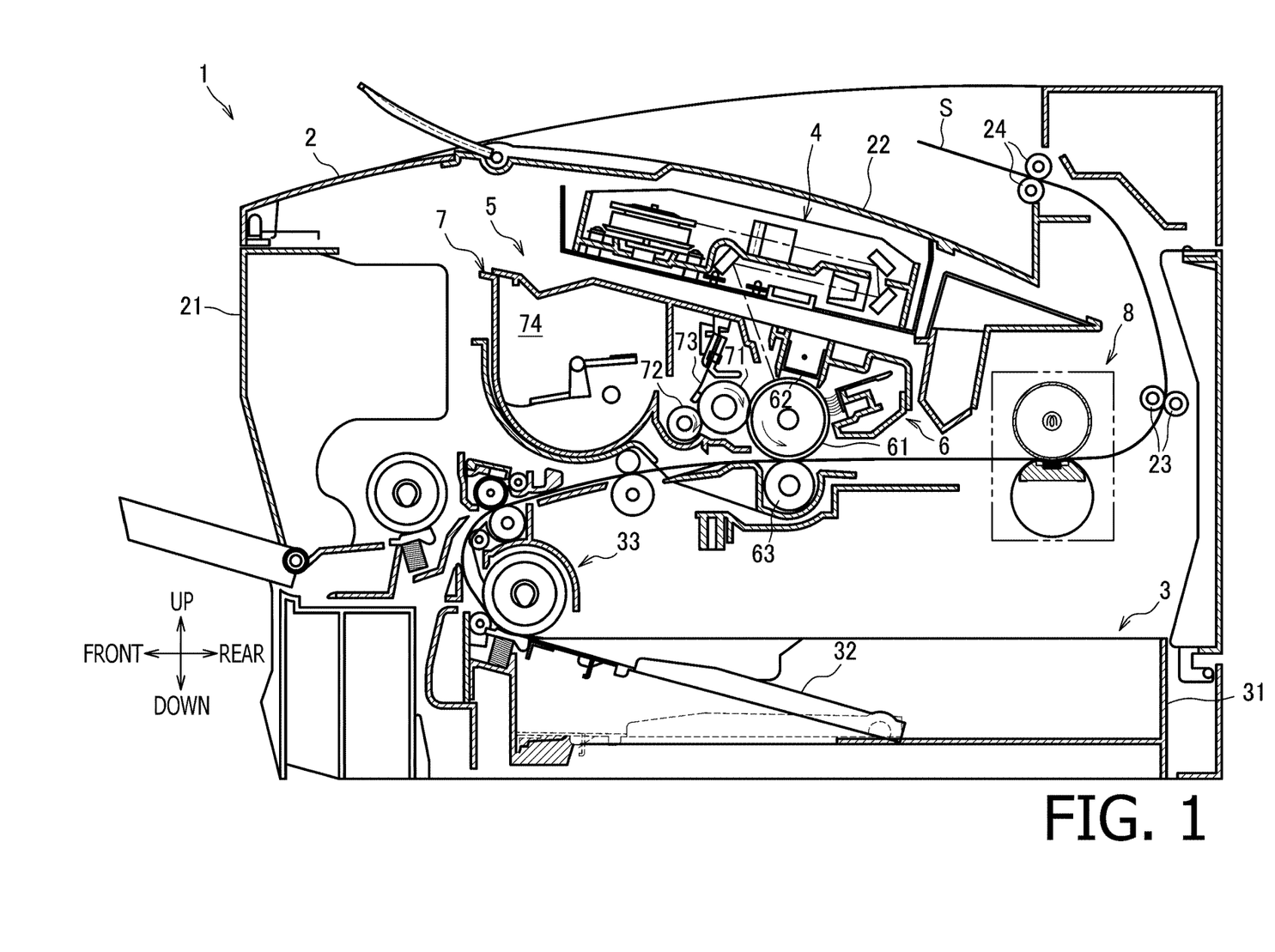
FIG. 1 is a cross-sectional view of a laser printer according to an embodiment of the present disclosure.

As shown in FIG. 1, the laser printer 1 includes a feeder 3, an exposure device 4, a process cartridge 5, and a fuser 8, which are stowed in a housing 2.

The feeder 3 is arranged at a lower position in the housing 2 and includes a feeder tray 31, a sheet-lifting plate 32, and a feeder device 33. The feeder tray 31 may store one or more sheets S therein. The sheet(s) S stored in the feeder tray 31 may be lifted upward by the sheet-lifting plate 32 and fed to the process cartridge 5 by the feeder device 33.

The exposure device 4 is arranged at an upper position in the housing 2 and includes a light source, a polygon mirror, lenses, and reflective mirrors. In the exposure device 4, a laser beam emitted from the light source based on image data may scan a surface of a photosensitive drum 61 so that the surface of the photosensitive drum 61 may be selectively exposed to the laser beam.

The process cartridge 5 is arranged at a lower position with respect to the exposure device 4 and is detachable from the housing 2 through an opening, which is exposed when a front cover 21 on the housing 2 is opened. The process cartridge 5 includes a drum unit 6 and a developing unit 7. The drum unit 6 includes the photosensitive drum 61, a charger 62, and a transfer roller 63. The developing unit 7 is detachably attachable to the drum unit 6 and includes a developing roller 71, a supplier roller 72, a layer-restrictive blade 73, and a container 74 to contain toner.

In the process cartridge 5, the surface of the photosensitive drum 61 may be charged evenly by the charger 62 and exposed to the laser beam from the exposure device 4 to form an electrostatic latent image based on the image data on the photosensitive drum 61. Meanwhile, the toner in the container 74 may be supplied through the supplier roller 72 to the developing roller 71 and enter a position between the developing roller 71 and the layer-restrictive blade 73 to form a layer in a predetermined thickness to be carried on the developing roller 71. The toner supplied to the developing roller 71 may be further supplied from the developing roller 71 to the electrostatic latent image formed on the photosensitive drum 61. Thereby, the electrostatic latent image may be developed to form a toner image on the photosensitive drum 61. Thereafter, the sheet S may be conveyed through a position between the photosensitive drum 61 and the transfer roller 63 so that the toner image may be transferred from the photosensitive drum 61 to the sheet S.

The fuser 8 is arranged at a rearward position with respect to the process cartridge 5. The sheet S with the toner image transferred thereon may pass through the fuser 8 so that the transferred toner image may be fused to be fixed on the sheet S. The sheet S with the toner image fixed thereon may be conveyed by conveyer rollers 23, 24 to be ejected outside the housing 2 and rest on an ejection tray 22.

Figure 2A:
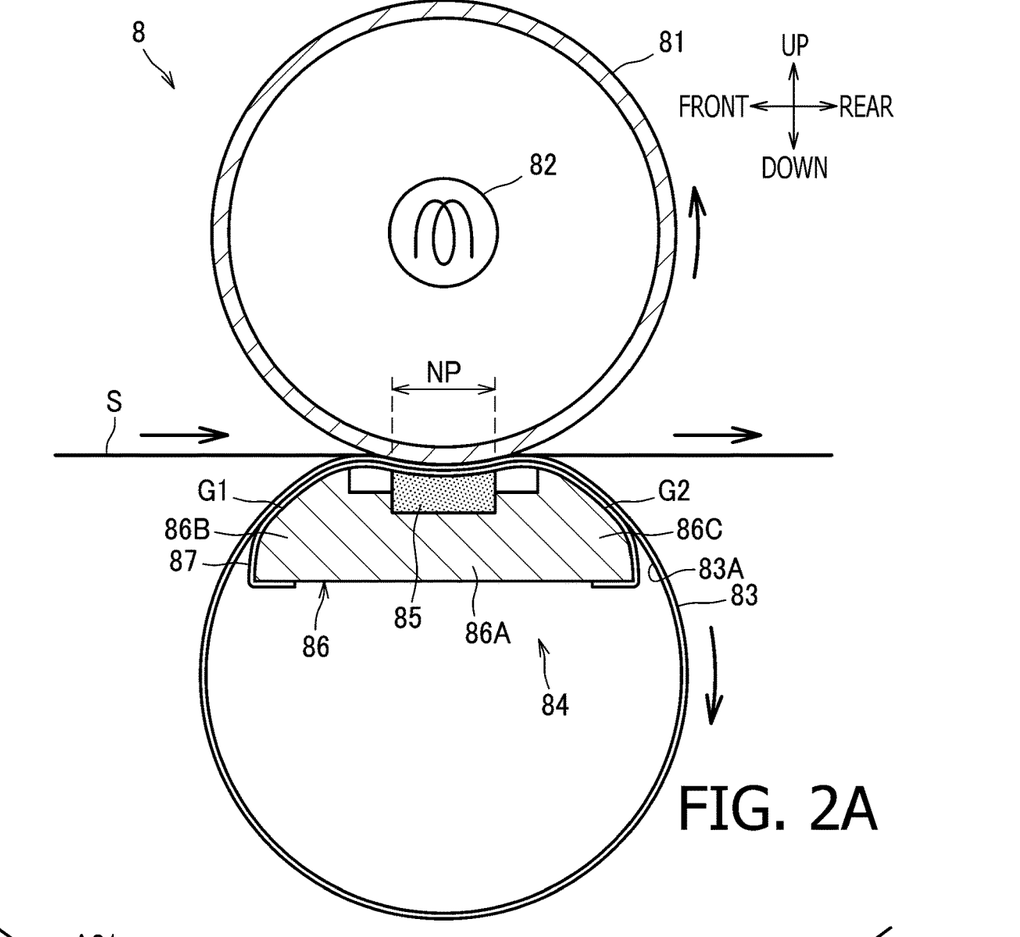
FIG. 2A is a cross-sectional view of a fuser according to the embodiment of the present disclosure.

As shown in FIG. 2A, the fuser 8 includes a heat roller 81, a heater 82, an endless belt 83, and a pressure unit 84. While one of the heat roller 81 and the pressure unit 84 is urged against the other of the heat roller 81 and the pressure unit 84, a nipping portion NP is formed between the heat roller 81 and the endless belt 83.

In the following paragraphs, a direction of a width of the endless belt 83 may be called merely as a widthwise direction, and a moving direction for the endless belt 83 to move through the nipping portion NP may be called as a moving direction. A direction, in which the heat roller 81 and the pressure unit 84 (more specifically, a pressure pad 85, which will be described further below) face each other, may be called as a facing direction. In the present embodiment, the widthwise direction is parallel to a rotation axis of the heat roller 81 and extends along the left-right direction. Meanwhile, the moving direction extends along the front-rear direction, and the facing direction extends along the vertical direction. The moving direction includes a direction extending along a rotating direction of the heat roller 81 and a rotating direction of the endless belt 83 in the nipping portion NP.

The heat roller 81 is a roller having a cylindrical base. For example, the heat roller 81 may include a base tube made of metal, such as aluminum, and a mold-release layer made of, for example, fluorine resin. The heat roller 81 may be driven by a driving force from a motor, which is not shown, to rotate counterclockwise in FIGS. 2A-2B. The heat roller 81 is arranged to contact an outer circumferential surface of the endless belt 83.

The heater 82 is a heat source to heat the heat roller 81 and is arranged in a radially inside of the heat roller 81. The heater 82 may include, for example, a halogen lamp that may be electrified to emit light and radiantly heat the heat roller 81.

The endless belt 83 is a cylindrical member with flexibility. The endless belt 83 may have, for example, a base member made of metal, such as stainless steel, or resin, such as polyimide resin, and a mold-release layer made of fluorine resin formed on an outer circumferential surface of the base member. The endless belt 83 may be rotated clockwise in FIGS. 2A-2B by the rotation of the heat roller 81. Thereby, the endless belt 83 may convey the sheet S in cooperation with the heat roller 81.

To an inner circumferential surface 83A of the endless belt 83, applied is a lubricant agent such as grease. Therefore, the inner circumferential surface 83A of the endless belt 83 and the pressure unit 84 may slide with respect to each other smoothly, and the endless belt 83 may be rotated efficiently.

The pressure unit 84 includes a pressure pad 85 being an example of a nip-formation member, a holder 86 to support the pressure pad 85, and a slidable sheet 87.

The pressure pad 85 is arranged a radially inside of the endless belt 83 and is covered with the endless belt 83. The pressure pad 85 is made of an elastomeric material such as rubber and is arranged to nip the endless belt 83 in cooperation with the heat roller 81 to form the nipping portion NP at a position between the heat roller 81 and the pressure pad 85. With the nipping portion NP formed by the pressure pad 85 in cooperation with the heat roller 81, the sheet S passing through the nipping portion NP may be heated by and pressed against the heat roller 81 so that the toner image may be fused and fixed on the sheet S.

In the present embodiment, the nipping portion NP refers to a range, in which the endless belt 83 is nipped between the pressure pad 85 and the heat roller 81, in other words, a range, in which nipping pressure is applicable to the sheet S.

In particular, the nipping portion NP refers to a range corresponding to a part of the endless belt 83, in which the outer circumferential surface of the endless belt 83 contacts the heat roller 81, between an upstream end and a downstream end of the pressure pad 85 in the moving direction and between one end and the other end of the pressure pad 85 in the widthwise direction.

The slidable sheet 87 may be an approximately rectangular sheet arranged to reduce friction resistance between the pressure pad 85 and the endless belt 83. The slidable sheet 87 is interposed in the nipping portion NP between the inner circumferential surface 83A of the endless belt 83 and the pressure pad 85. In particular, one end of the slidable sheet 87 is fixed to an upstream portion of the holder 86 in the moving direction. Moreover, the slidable sheet 87 is strained over an upward face of the holder 86 and is fixed to a downstream portion of the holder 86 in the moving direction at the other end thereof.

It may be noted that the other end of the slidable sheet 87 may not necessarily be fixed to the holder 86 but may be released free. Moreover, a material of the slidable sheet 87 may be, but not necessarily be limited to, resin sheet containing polyimide.

The holder 86 may be made of resin. The holder 86 includes a base part 86A to support the pressure pad 85 and guide parts 86B, 86C to guide the endless belt 83. The guide part 86B is arranged at an upstream end of the base part 86A in the moving direction. The guide part 86B includes a guide surface G1 to guide the inner circumferential surface 83A of the endless belt 83. The guide part 86C is arranged at a downstream end of the base part 86A in the moving direction. The guide part 86C includes a guide surface G2 to guide the inner circumferential surface 83A of the endless belt 83.

Figure 2B:
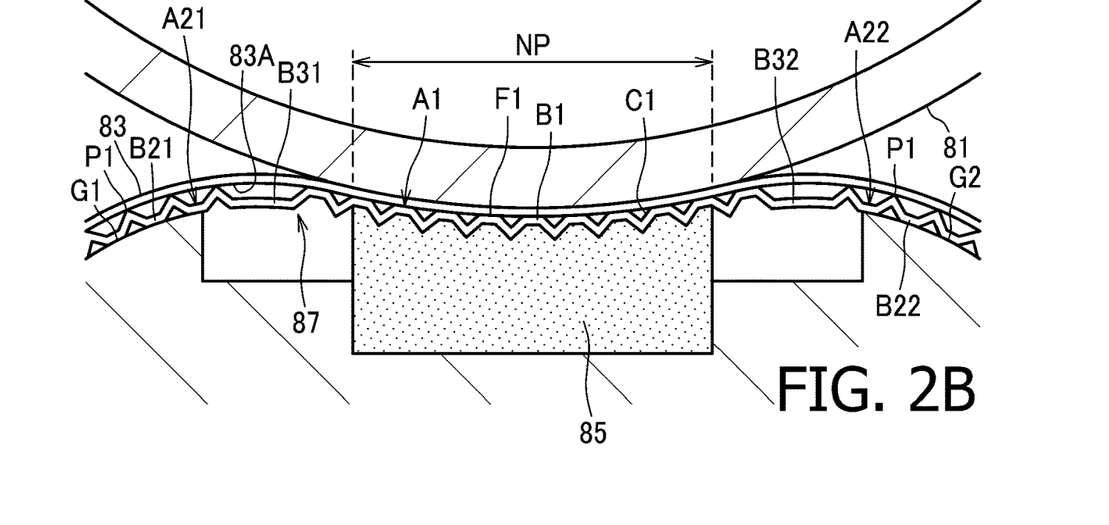
FIG. 2B is an enlarged partial cross-sectional view of the fuser according to the embodiment of the present disclosure.
Figure 3:
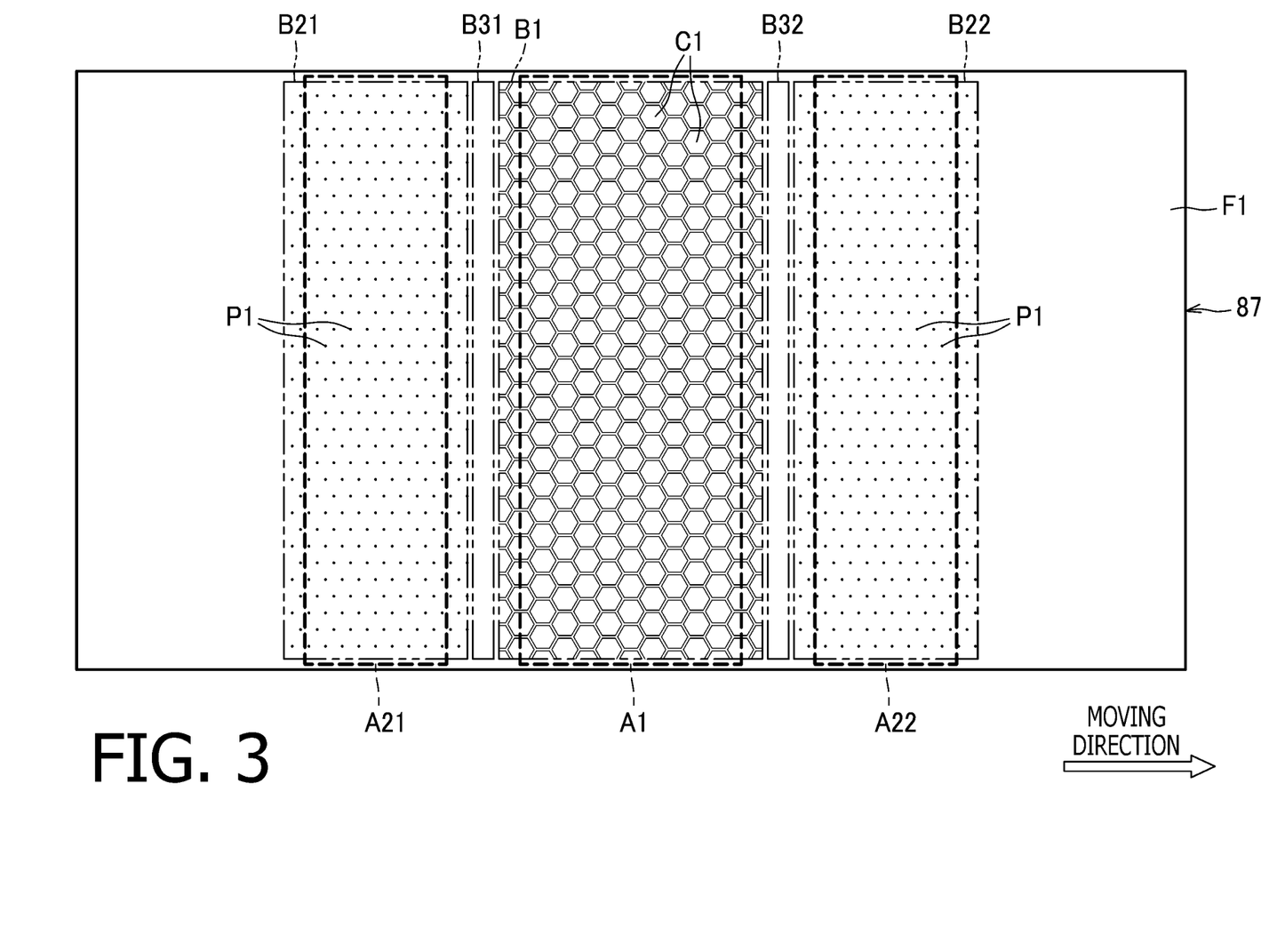
FIG. 3 is a plan view of a slidable sheet in the fuser according to the embodiment of the present disclosure.

As shown in FIG. 2B, the slidable sheet 87 includes a surface F1 that contacts the inner circumferential surface 83A of the endless belt 83 and another surface (unsigned) that contacts the pressure pad 85 on a side opposite to the surface F1. As shown in FIG. 3, the surface F1 of the slidable sheet 87 includes a part B1, parts B21, B22, and parts B31, B32. In the part B1, a plurality of dents C1 are arrayed in a regular pattern. In each of the parts B21, B22, a plurality of projections P1 are arrayed in another regular pattern. The parts B31, B32 each has a plain surface and extends longitudinally in the widthwise direction.

The part B1 having the dents C1 is located in a range A1, which is a part of the slidable sheet 87 corresponding to the nipping portion NP. The range A1 is a part of the slidable sheet 87, to which the nipping pressure from the heat roller 81 is applied through the endless belt 83. The part B1 may be arranged, not only inside the range A1, but also outside the range A1. In other words, the part B1 coincides at least partly with the range A1. As shown in FIG. 3, with regard to the widthwise direction, the part B1 extends substantially from one widthwise end to the other widthwise end of the slidable sheet 87. With regard to the moving direction, the part B1 may be larger than the range A1 in the moving direction and may extend upstream and downstream beyond an upstream end and a downstream end of the range A1, respectively. The dents C1 are arranged at least in a part of the slidable sheet 87 corresponding to the nipping portion NP. In other words, the dents C1 may not necessarily be arranged entirely throughout the range corresponding to the nipping portion NP but may be arranged merely in a part of the range corresponding to the nipping portion NP.

The parts B21, B22 having the projections P1 are located to coincide at least partly with ranges A21, A22, respectively. The ranges A21, A22 correspond to portions different from the nipping portion NP. In other words, the ranges A21, A22 are deviated from the range A1 that corresponds to the nipping portion NP. The range A21 is a part of the slidable sheet 87 interposed between the guide surface G1 of the holder 86 and the inner circumferential surface 83A of the endless belt 83 (see FIG. 2B). The range A22 is a part of the slidable sheet 87 interposed between the guide surface G2 of the holder 86 and the inner circumferential surface 83A of the endless belt 83 (see FIG. 2B).

The part B21 is arranged at an upstream position with respect to the nipping portion NP, and to the part B1, in the moving direction. The part B22 is arranged at a downstream position with respect to the nipping portion NP, and to the part B1, in the moving direction. The parts B21, B22 may be larger than the ranges A21, A22, respectively, in the moving direction and may extend upstream and downstream beyond an upstream end of the range A21 and a downstream end of the range A22, respectively, in the moving direction. Meanwhile, the projections P1 may be arranged merely in at least one of the range interposed between the guide surface G1 and the inner circumferential surface 83A of the endless belt 83 and the range interposed between the guide surface G2 and the inner circumferential surface 83A of the endless belt 83. In other words, the projections P1 may not necessarily be arranged entirely throughout a predetermined portion in the slidable sheet 87 corresponding to the ranges A21, A22 but may be arranged merely in at least a part of the predetermined portion in the slidable sheet 87 corresponding to the ranges A21, A22.

The part B31 is located between the part B21, which is the upstream one of the parts B21, B22, and the part B1 in the moving direction. The part B32 is located between the part B22, which is the downstream one of the parts B21, B22, and the part B1 in the moving direction.

In particular, as shown in FIG. 2B, the part B31, which is the upstream one of the parts B31, B32, is located between the guide surface G1 and the nipping portion NP in a circumferential direction of the endless belt 83. The part B32, which is the downstream one of the parts B31, B32, is located between the guide surface G2 and the nipping portion NP in the circumferential direction of the endless belt 83.

Figure 4A:
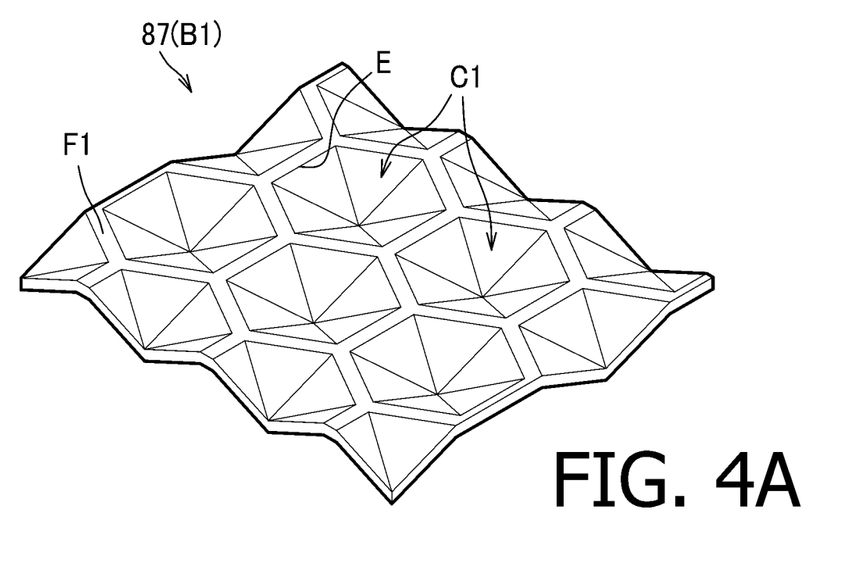
FIG. 4A is an enlarged perspective view of dents on a surface of the slidable sheet according to the embodiment of the present disclosure.
Figure 4B:
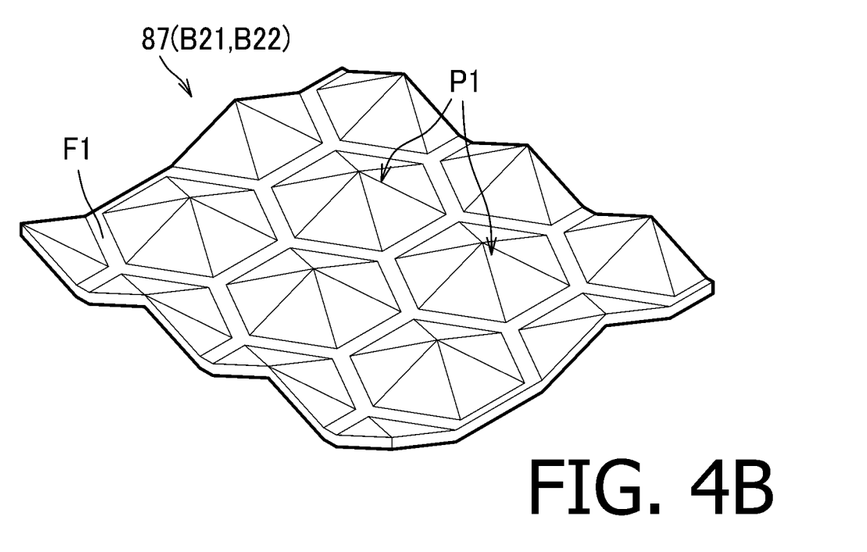
FIG. 4B is an enlarged perspective views of projections formed on the surface of the slidable sheet according to the embodiment of the present disclosure.

As shown in FIG. 4A, each of the dents C1 arranged in the part B1 has a polyhedrally concave shape, in particular, inverted hexagonal pyramidal shape with a regular hexagonal shape at an edge E and six triangular sides. The plurality of dents C1 are arrayed in a honeycomb arrangement. On the other hand, as shown in FIG. 4B, each of the projections P1 arranged in the parts B21, B22 is in a polyhedrally convex shape, in particular, hexagonal pyramidal shape with a regular hexagonal shape at a base and six triangular sides. The plurality of projections P1 are arrayed in a honeycomb arrangement. In other words, the projections P1 are arranged to be evenly spaced apart from one another along the circumferential direction of the endless belt 83 and in the widthwise direction of the endless belt 83. It may be noted that the shape of the dents C1 may be the same hexagonal, but substantially vertically inverted, pyramidal shapes as the projections P1.

Meanwhile, the pressure pad 85 described earlier may be formed in a material which is softer than the slidable sheet 87. In this arrangement, even when the slidable sheet 87 is pressed by the pressure pad 85 against the endless belt 83, the shapes of the dents C1 in the slidable sheet 87 may be maintained without collapsing.

Some of non-limiting benefits achievable by the configuration described above will be described below. That is, the plurality of projections P1 are arranged in the ranges A21, A22 on the surface F1 of the slidable sheet 87 that correspond to the portions different from the nipping portion NP. Therefore, areas of contacts between the inner circumferential surface 83A of the endless belt 83 and the slidable sheet 87 in the ranges A21, A22 that correspond to the portions different from the nipping portion NP may be reduced, and intensity of sliding resistance may be lowered. Moreover, compared to the configuration, for example, in which the projections are formed entirely on the slidable sheet, the lubricant agent may be effectively held in the dents C1 arranged in the range A1 corresponding to the nipping portion NP. Therefore, a quality of image on the sheet S through the fuser 8 may be restrained from lowering.

The parts B21, B22 are arranged in the ranges A21, A22, which are between the guide surfaces G1, G2, respectively, and the inner circumferential surface 83A. Therefore, in the ranges A21, A22, which are different from the nipping portion NP and in which the frictional resistance tends to increase, the sliding resistance between the endless belt 83 and the slidable sheet 87 may be lowered effectively.

The parts B31, B32 with the plain surfaces are arranged between the guide surfaces G1, G2, which are free from the nipping pressure produced in the nipping portion NP, and the nipping portion NP. Therefore, compared to a configuration, for example, in which the parts with the plain surfaces are arranged between a guide member and the endless belt, the sliding resistance may be lowered more effectively at the parts B31, B32.

The plurality of dents C1 are arrayed in the honeycomb arrangement. Therefore, the lubricant agent may be effectively held in the dents C1 preferably and stably.

Each of the projections P1 is formed in the hexagonal pyramidal shape with a vertex. Therefore, the projections P1 may contact the inner circumferential surface 83A of the endless belt 83 at points rather than areas. In this regard, the sliding resistance may be lowered more effectively.

The plurality of projections P1 are arrayed in the regular pattern, in which the projections P1 are evenly spaced apart from one another in the circumferential direction and the widthwise direction. Therefore, the moving path for the endless belt 83 may be stabilized. In other words, the endless belt 83 may be moved more stably.

In the following paragraphs, described will be examples modified from the embodiment described above according to the present disclosure. In the following description, items or structures which are substantially the same as or similar to those described in the above embodiment may be denoted by the same reference signs, and description of those may be omitted.

Figures 5A, 5B:
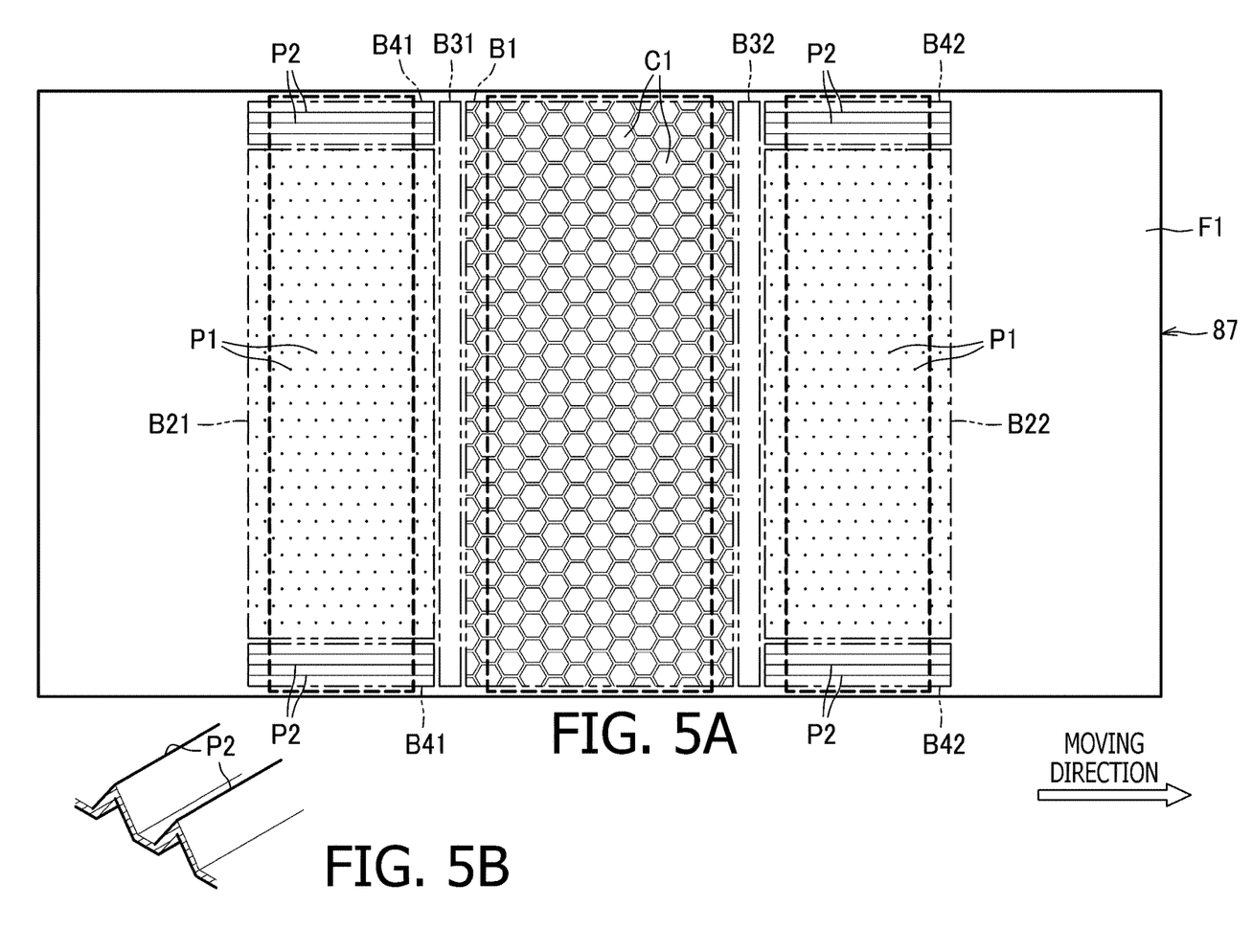
FIG. 5A is a plan view of a slidable sheet in a fuser according to a first modified example of the embodiment of the present disclosure.
FIG. 5B is a perspective view of projections in the slidable sheet according to the first modified example of the embodiment of the present disclosure.

As shown in FIG. 5A, the surface F1 of the slidable sheet 87 may include parts B41, B42, in which a plurality of projections P2 are formed, on the sides of the parts B21, B22, in the widthwise direction. In particular, according to the configuration in the present example, the parts B21, B22 are smaller in the widthwise direction than the width of the slidable sheet 87.

The part B41 may be arranged on each side in the widthwise direction of the upstream part B21 in the moving direction. The part B42 may be arranged on each side in the widthwise direction of the downstream part B21 in the moving direction. The parts B41, B42 may have substantially the equal length as the length of the part B21 and the length of the part B22 in the circumferential direction of the endless belt 83.

As shown in FIGS. 5A-5B, the projections P2 formed in the parts B41, B42 may extend longitudinally in a direction that intersects with the widthwise direction. More specifically, the projections P2 may extend orthogonally to the widthwise direction. In other words, the projections P2 extend along the rotating direction of the endless belt 83. A length of each projection P2 in the circumferential direction of the endless belt 83 is larger than a length of each projection P1 arranged in the parts B21, B22 in the circumferential direction. In particular, each projection P2 may have a longitudinal ridge shape that extends continuously from one end to the other end of the part B41 or B42 in the circumferential direction.

The parts B41, B42 may have a plurality of, for example, three (3) projections P2, which are arranged spaced apart from one another in the widthwise direction.

According to this configuration, if, for example, the lubricant agent in the parts B21, B22 flow outward in the widthwise direction, the projections P2 extending orthogonally to the widthwise direction may stop the flows. Therefore, the lubricant agent may be restrained from leaking.

Moreover, the length of the projections P2 in the circumferential direction is larger than the length of the projections P1 in the circumferential direction. Therefore, the flow of the lubricant agent may be stopped more effectively by the projections P2 with the greater length in the circumferential direction. In particular, while the projections P2 extend continuously from the one end to the other end of the parts B41, B42 in the circumferential direction, the lubricant agent may be restrained from leaking more effectively.

Figure 6:
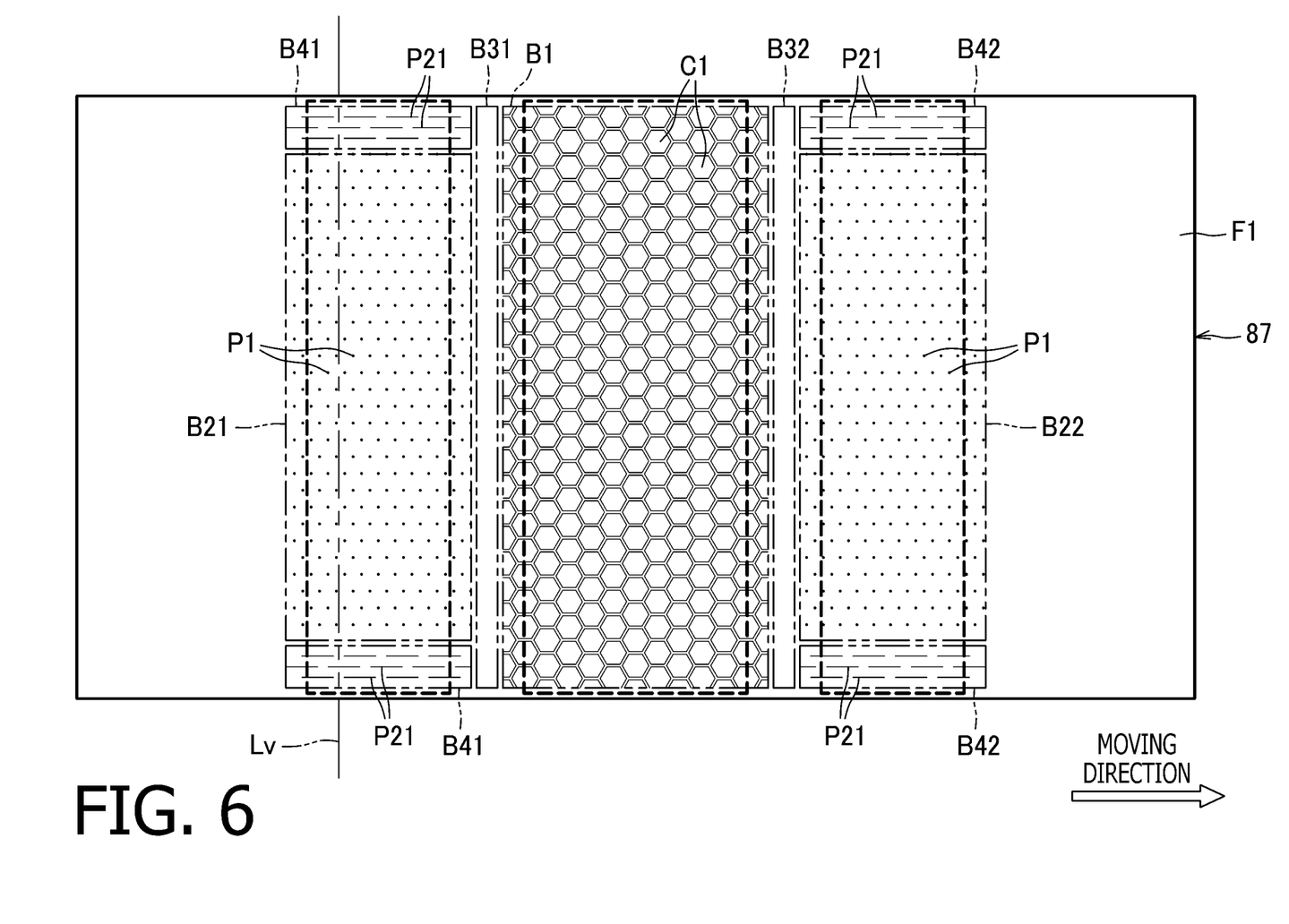
FIG. 6 is a plan view of a slidable sheet in a fuser according to a second modified example of the embodiment of the present disclosure.

For another example, as shown in FIG. 6, projections P21 may be arranged to be spaced apart from one another in the circumferential direction and in the widthwise direction. In particular, according to the configuration in the present example, three (3) ridges of projections P21 may be arranged to be spaced apart from one another in the widthwise direction, and each ridge may include a plurality of segmented projections P21 that are arranged to be spaced apart from one another in the circumferential direction.

The ridges of projections P21 may extend in the direction orthogonal to the widthwise direction. The projections 21 are arranged such that every virtual line (e.g., a virtual line Lv), extending through the parts B41, B42 may intersect with at least one of the projections P21. The plurality of segmented projections P21 are arranged alternately in the widthwise direction. In other words, a plurality of segmented projections P21 in one of two (2) ridges adjoining in the widthwise direction may block gaps between every two (2) segmented projections P21 adjoining in the circumferential direction in the other of the two adjoining ridges.

According to this configuration, if, for example, the lubricant agent tends to flow outward in the widthwise direction, at least one of the projections P21 may block the flow, and the lubricant may be restrained from leaking effectively.

Figure 7:
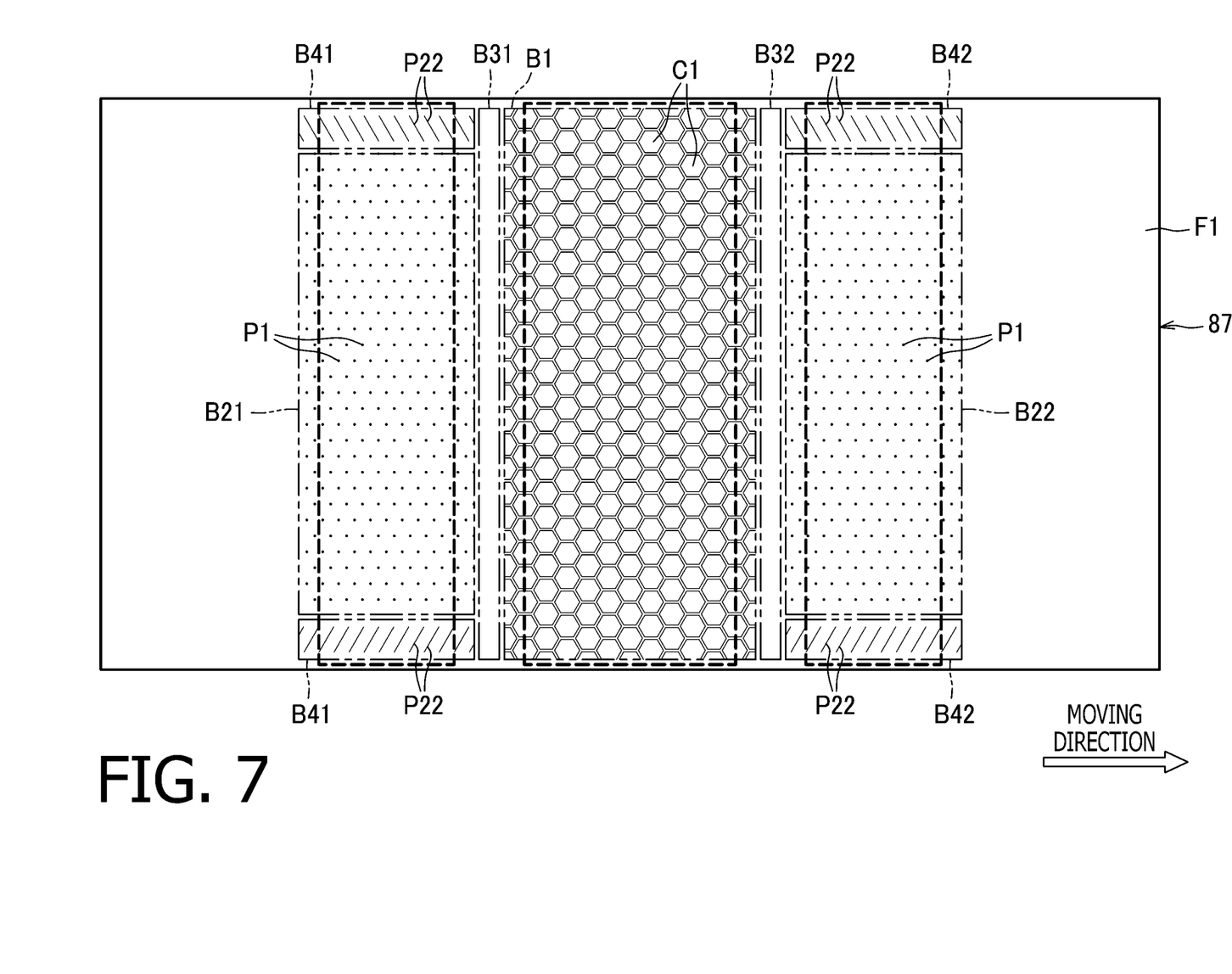
FIG. 7 is a plan view of a slidable sheet in a fuser according to a third modified example of the embodiment of the present disclosure.

For another example, as shown in FIG. 7, projections P22 may extend obliquely with respect to the circumferential direction of the endless belt 83. In particular, according to the configuration in the present example, one end of each projection P22 in the widthwise direction is located upstream in the moving direction and outward in the widthwise direction, and the other end of the projection P22 in the widthwise direction is located downstream in the moving direction and inward in the widthwise direction. Two (2) projections P22 adjoining in the circumferential direction among the plurality of projections P22 overlap each other at least partly in a view along the widthwise direction.

According to this configuration, if, for example, the lubricant agent tends to flow outward in the widthwise direction, at least one of the projections P22 may stop the flow, and the lubricant may be restrained from leaking effectively. Meanwhile, the lubricant agent may flow downstream in the moving direction due to the rotation of the endless belt 83. In such a case, the lubricant agent may be guided to return inward in the widthwise direction by the projections P22, which extend obliquely to the circumferential direction. Thus, the lubricant may be restrained from leaking even more effectively.

Figure 8:
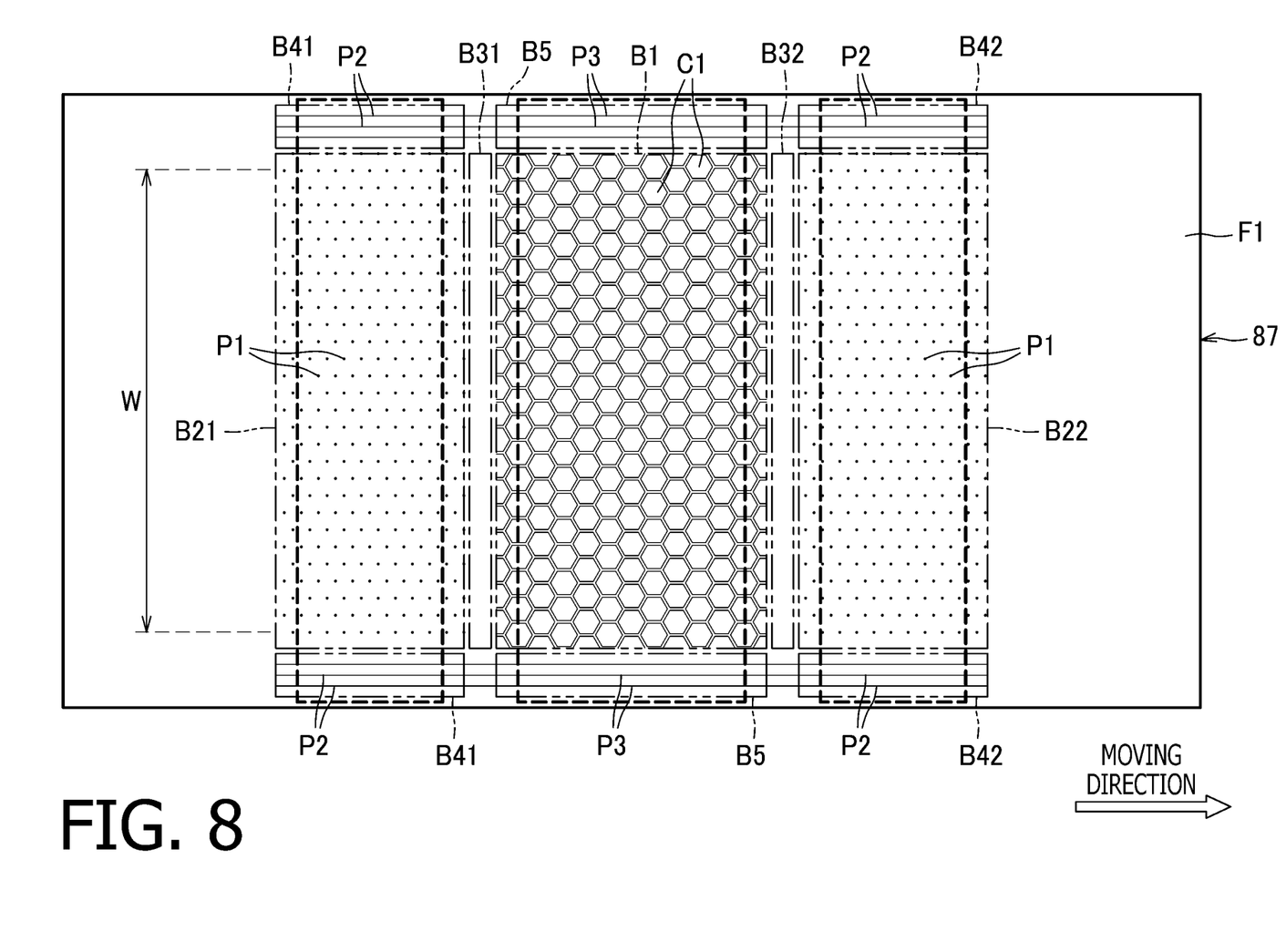
FIG. 8 is a plan view of a slidable sheet in a fuser according to a fourth modified example of the embodiment of the present disclosure.

For another example, as shown in FIG. 8, the surface F1 of the slidable sheet 87 may include parts B5, in which a plurality of projections P3 are formed, on the sides of the part B1 in the widthwise direction. In particular, according to the configuration in the present example, the surface F1 of the slidable sheet 87 includes the parts B21, B22, and the parts B41, B42, which are substantially similar to those in the previous example shown in FIG. 5; the part B1 and the parts B31, B32, which may be different to some extent from those in the previous example shown in FIG. 5 in dimensions; and the parts B5, which are not included in the previous example shown in FIG. 5.

A dimension of the part B1 in the widthwise direction is larger than or equal to a maximum width W of a sheet S capable of passing through the nipping portion NP and is smaller than a dimension of the slidable sheet 87 in the widthwise direction. Dimensions of the parts B21, B22 and the parts B31, B32 in the widthwise direction are equal to the dimension of the part B1 in the widthwise direction.

The projections P3 have the same cross-sectional shapes as the projections P2 (see FIGS. 5A-5B). The projections P3 are formed continuously with the projections P2 along the moving direction. In other words, the projections P3 may be formed integrally with the projections P2.

According to this configuration, the projections P3 are formed in ranges outside the width of the maximum usable sheet S. Therefore, the sliding resistance may be lowered without lowering the imaging quality. Moreover, the projections P2 and the projections P3 having the same cross-sectional shapes are formed integrally. Therefore, the lubricant may be restrained from leaking even more reliably.

Figure 9:
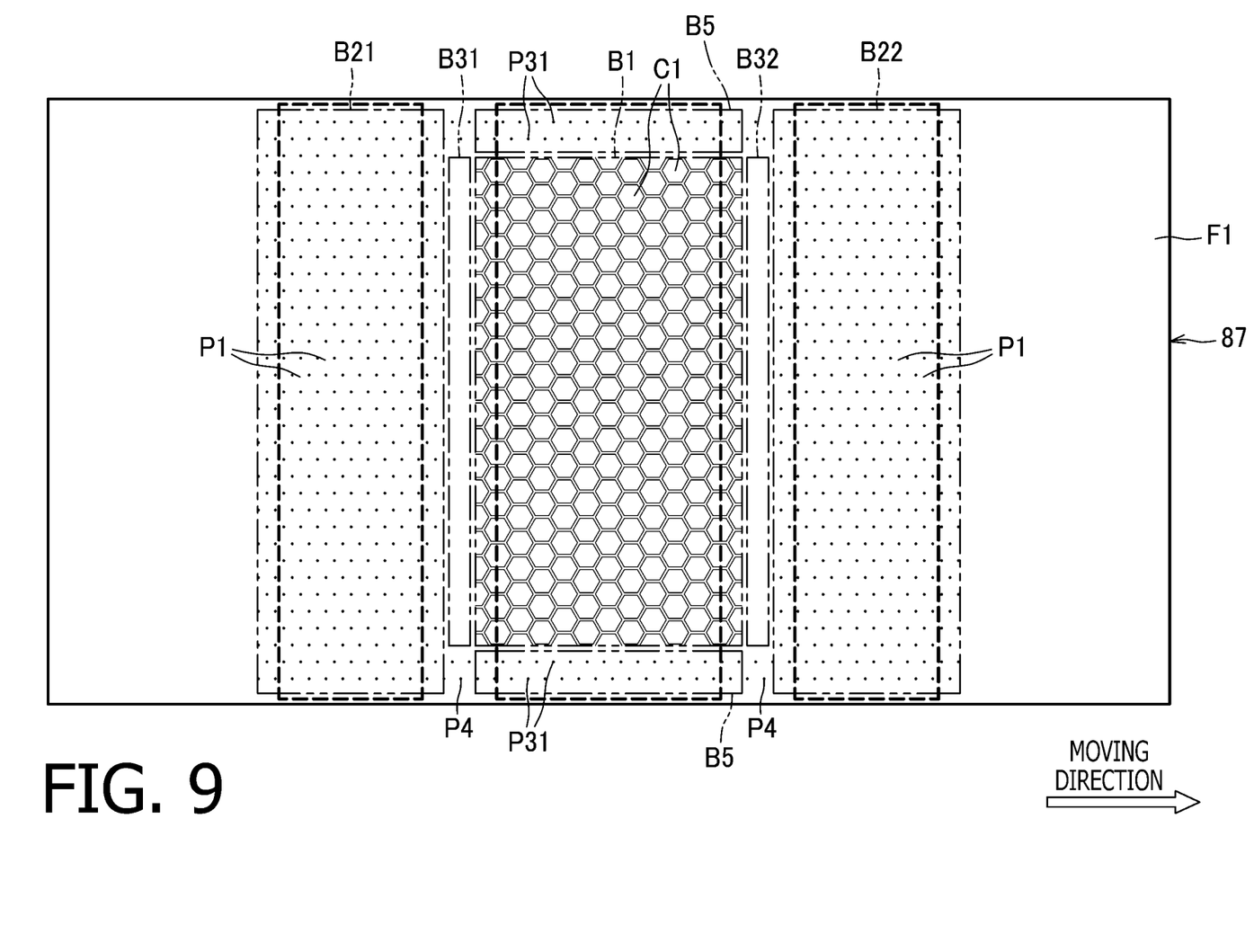
FIG. 9 is a plan view of a slidable sheet in a fuser in a fifth modified example according to the embodiment of the present disclosure.

For another example, as shown in FIG. 9, projections P31 in the parts B5 may have the same or similar shape as the projections P1 in arranged in the parts B21, B22 (see FIG. 4B). In particular, according to the configuration in the present example, the surface F1 of the slidable sheet 87 may include the parts B21, B22, which are substantially the same as those in the example shown in FIG. 3; the part B1 and the parts B31, B32, which are substantially the same as those in the example shown in FIG. 8; and the parts B5 having the projections P31, of which shapes are different from the projections P3 in the example shown in FIG. 8.

The projections P31 are arrayed in the regular pattern similarly to the projections P1. Meanwhile, in positions between the part B21 and the parts B5 and between the part B22 and the parts B5, formed are projections P4. The projections P1, the projections P31, and the projections P4 are arranged in a predetermined interval along the widthwise direction. In this formation, the sliding resistance may be lowered effectively.

Although examples of carrying out the invention have been described, those skilled in the art will appreciate that there are numerous variations and permutations of the fuser and the sheet conveyer that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

For example, the shape at the edge E of each dent C1 in the part B1 may not necessarily be limited to the regular hexagon but may be in other polygonal shape or in a circular or oval shape. In other words, the dents C1 may be in other polyhedrally or conically concave shape. Moreover, dimensions of the edge E of each dent C1, a depth of the dent C1, and distances from adjoining dents C1 may not necessarily be limited, or the dents C1 may not necessarily be arrayed in the regular pattern arrangement. In this regard, however, in a case where a plurality of dents having different dimensions at the edges E are arranged irregularly in the range corresponding to the nipping portion NP, compared to the configuration, in which the plurality of dents C1 with equal dimensions at the edges E are arrayed in the regular pattern, the lubricant agent may be distributed unevenly in the range corresponding to the nipping portion NP, and the sliding resistance may increase undesirably. Therefore, it may be preferable that the plurality of dents with the equal dimensions at the edges and the equal depth are arrayed in the regular pattern.

For another example, the shape of each projection P1 may not necessarily be limited to the hexagonal pyramidal shape but may be in other polyhedrally or conically convex shape. Moreover, the projection P1 may be in a shape of a frustum or a spherical cap. In this regard, however, in a case where the projections are formed in the shapes of frustums or spherical caps, compared to the configuration, in which the projections P1 are in the pyramidal or conical shapes with apexes, areas of contacts between the inner circumferential surface of the endless belt and the slidable sheet may increase, and the sliding resistance may undesirably increase. Therefore, it may be preferable that the projections P1 are each in a pyramidal or conical shape. Moreover, dimensions including a height of each projection and distances from adjoining projections may not necessarily be limited, or the projections may not necessarily be arrayed in the regular pattern arrangement. In this regard, however, in a case where a plurality of projections having different dimensions are arranged irregularly, compared to the configuration, in which the plurality of projections P1 with equal dimensions are arrayed in the regular pattern, the endless belt may not be rotated stably but the endless belt may rattle while rotating. Therefore, it may be preferable that the plurality of projections P1 with the equal dimensions are arrayed in the regular pattern in the range corresponding to the other portion different from the nipping portion NP within the surface F1 of the slidable sheet that may contact the inner circumferential surface of the endless belt, in particular, in the range interposed between the guide member and the endless belt.

For another example, the parts B21, B22 may not necessarily be provided in both of the upstream and downstream positions with respect to the nipping portion NP in the moving direction as long as at least one of the parts B21, B22 is provided in the upstream or downstream position with respect to the nipping portion NP.

For another example, the heater 82 may not necessarily be limited to the halogen lamp but may be, for example, a carbon heater.

For another example, the nip-formation member to form the nipping portion NP may not necessarily be limited to the pressure pad 85 made of the elastomeric material such as rubber but may include, for example, a plate member made of rigid resin or metal that may not deform by the pressure. For another example, the nip-formation member may be formed integrally with the holder 86. However, in a case where the nip-formation member is made of the rigid resin or metal, the dents and/or the projections on the surface of the slidable sheet may collapse against the rigid nip-formation member in a long-term use and may cause the sliding resistance to increase, and/or the concave and convex patterns on the slidable sheet may be stamped on the endless belt, which may cause the imaging quality to be lowered. In this regard, it may be preferable that the nip-formation member is made of an elastomeric material such as rubber being resiliently deformable by the pressure from the concave and convex shapes of the slidable sheet, as described above in the exemplary form of the pressure pad 85.

For another example, the heat roller 81 being a rotating body containing the heater 82 may not necessarily be in the form of a roller but may be, for example, replaced with an endless belt with a heater to heat an inner circumferential surface of the belt. Moreover, the heater may not necessarily be arranged inside the rotating body. For example, a heater in an externally heating method, in which the heater is arranged outside to heat an outer circumferential surface of the rotating body, or an induction heating (IH) method, may be employed. For another example, the heater may be arranged inside an endless belt so that the heater may indirectly heat a rotating body that contacts the outer circumferential surface of the endless belt. For another example, the rotating body and the endless belt may each be equipped with a heater.

For another example, the nipping formation may not necessarily be employed in the fuser 8 but may be applied to a conveyer other than a fuser. For example, the nipping formation may be applied to a conveyer having a conveyer roller and a conveyer belt, which may nip and convey a sheet in there-between.

For another example, the nipping formation may not necessarily be applied to the fuser 8 as described above but may be applied to a variety of types of fusers. For example, a fuser may be equipped with a fusing roller and a pressure roller, which together form a nipping portion, and a heater unit pressed against the fusing roller at a predetermined nipping intensity to heat the fusing roller so that toner image may be fixed onto a sheet in the nipping portion. In this formation, the present disclosure may be applied in the heater unit, which is equipped with an endless belt and a heat applier to nip the endless belt in cooperation with the fusing roller, and a slidable sheet may be arranged between the heat applier and the endless belt.

For another example, the configuration described above may not necessarily be applied to a laser printer but may be applied to other imaging apparatuses that may print an image, such as a copier and a multifunction peripheral machine. Moreover, the elements described in the embodiment and the modified examples may be selectively combined.

What is claimed is:

1. A fuser, comprising:
a heater;
a rotating body configured to be heated by the heater;
an endless belt;
a nip-formation member configured to form a nipping portion to nip the endless belt between the nip-formation member and the rotating body; and
a slidable sheet interposed between an inner circumferential surface of the endless belt and the nip-formation member in the nipping portion,
wherein the slidable sheet includes a first part, in which a plurality of dents are arranged, on a surface contacting the inner circumferential surface of the endless belt, the first part being located in a range corresponding to the nipping portion, and
wherein each of the plurality of dents has a concave shape of one of a polyhedral pyramid and a cone.

2. The fuser according to claim 1,
wherein each of the plurality of dents has the concave shape of the polyhedral pyramid; and
wherein an edge of each of the plurality of dents on the surface contacting the inner circumferential surface of the endless belt inclines obliquely with respect to a moving direction, the moving direction being a direction for the endless belt to move through the nipping portion.

3. The fuser according to claim 1,
wherein each of the plurality of dents having a regular hexagonal shape at an edge is arrayed in a honeycomb arrangement.

4. The fuser according to claim 1, wherein the slidable sheet is a resin sheet containing polyimide.

5. The fuser according to claim 1, wherein lubricating grease is applied to the inner circumferential surface of the endless belt.

6. The fuser according to claim 1,
wherein the slidable sheet includes a second part, in which a plurality of projections are arranged, on the surface contacting the inner circumferential surface of the endless belt, the second part being located in a range corresponding to a portion different from the nipping portion; and
wherein areas of contact between the inner circumferential surface of the endless belt and the slidable sheet per unit area in the first part are larger than areas of contact between the inner circumferential surface of the endless belt and the slidable sheet per unit area in the second part.

7. The fuser according to claim 6, wherein each of the plurality of projections has a convex polyhedral shape of a polygonal pyramid.

8. The fuser according to claim 1, wherein the nip-formation member includes a pad formed with an elastomeric member.

9. The fuser according to claim 8, wherein the pad is softer than the slidable sheet.

10. An image forming apparatus, comprising:
a photosensitive drum;
a charger configured to charge a surface of the photosensitive drum;
an exposure device configured to expose the surface of the photosensitive drum;
a developing roller configured to supply toner to the surface of the photosensitive drum;
a transfer roller configured to transfer a toner image formed on the surface of the photosensitive drum to a sheet; and
a fuser configured to fix the toner image transferred from the surface of the photosensitive drum to the sheet, the fuser comprising:
a heater;
a rotating body configured to be heated by the heater;
an endless belt;
a nip-formation member configured to form a nipping portion to nip the endless belt between the nip-formation member and the rotating body; and a slidable sheet interposed between an inner circumferential surface of the endless belt and the nip-formation member in the nipping portion, wherein the slidable sheet includes a first part, in which a plurality of dents are arranged, on a surface contacting the inner circumferential surface of the endless belt, the first part being located in a range corresponding to the nipping portion, and wherein each of the plurality of dents has a concave shape of one of a polyhedral pyramid and a cone.

11. The image forming apparatus according to claim 10, wherein each of the plurality of dents has the concave shape of the polyhedral pyramid; and wherein an edge of each of the plurality of dents on the surface contacting the inner circumferential surface of the endless belt inclines obliquely with respect to a moving direction, the moving direction being a direction for the endless belt to move through the nipping portion.

12. The image forming apparatus according to claim 10, wherein each of the plurality of dents having a regular hexagonal shape at an edge is arrayed in a honeycomb arrangement.

13. The image forming apparatus according to claim 10, wherein the slidable sheet is a resin sheet containing polyimide.

14. The image forming apparatus according to claim 10, wherein lubricating grease is applied to the inner circumferential surface of the endless belt.

15. The image forming apparatus according to claim 10, wherein the nip-formation member includes a pad formed with an elastomeric member.

16. The image forming apparatus according to claim 15, wherein the pad is softer than the slidable sheet.

* * * * *